(12) United States Patent
Kwon

(10) Patent No.: US 10,023,147 B2
(45) Date of Patent: Jul. 17, 2018

(54) SELF STANDING CENTER SIDE AIRBAG

(71) Applicants: HYUNDAI MOTOR COMPANY, Seoul (KR); KIA MOTORS CORPORATION, Seoul (KR)

(72) Inventor: Hyock In Kwon, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/474,435

(22) Filed: Mar. 30, 2017

(65) Prior Publication Data
US 2018/0118150 A1    May 3, 2018

(30) Foreign Application Priority Data

Nov. 1, 2016  (KR) .................. 10-2016-0144500

(51) Int. Cl.
| | |
|---|---|
| *B60R 21/16* | (2006.01) |
| *B60R 21/207* | (2006.01) |
| *B60R 21/231* | (2011.01) |
| *B60R 21/216* | (2011.01) |

(52) U.S. Cl.
CPC .......... *B60R 21/207* (2013.01); *B60R 21/216* (2013.01); *B60R 21/23138* (2013.01); *B60R 2021/23146* (2013.01); *B60R 2021/23161* (2013.01)

(58) Field of Classification Search
CPC ............ B60R 21/23138; B60R 21/233; B60R 21/207; B60R 2021/23146; B60R 2021/23324; B60R 2021/23382
USPC .......................................... 280/743.1, 743.2
See application file for complete search history.

(56) References Cited

U.S. PATENT DOCUMENTS

| | | | |
|---|---|---|---|
| 6,959,945 B2 * | 11/2005 | Fischer | ................. B60R 21/233 280/739 |
| 8,342,570 B2 | 1/2013 | Higuchi | |
| 8,360,469 B2 | 1/2013 | Wiik et al. | |
| 8,414,018 B2 | 4/2013 | Choi et al. | |

(Continued)

FOREIGN PATENT DOCUMENTS

| | | | |
|---|---|---|---|
| JP | 2006008105 A | 1/2006 | |
| JP | 4165239 | 10/2008 | |

(Continued)

OTHER PUBLICATIONS

KR Office Action dated Nov. 20, 2017, Office Action in corresponding Korean Patent Application 10-2016-0144500, dated Nov. 20, 2017; 7 pages.

*Primary Examiner* — Toan To
(74) *Attorney, Agent, or Firm* — Lempia Summerfield Katz LLC

(57) ABSTRACT

A self standing center side airbag includes: an airbag cushion configured to be located at a side of an interior facing side of a seat back; a first through hole configured to penetrate through the airbag cushion and be located at a back with respect to a central line that bisects the airbag cushion in a front and back direction; a second through hole configured to penetrate through the airbag cushion and be located at a front with respect to the central line that bisects the airbag cushion in the front and back direction; and a tether configured to penetrate through the first through hole and the second through hole and have both ends fixed at the seat back side.

13 Claims, 11 Drawing Sheets

(56) References Cited

U.S. PATENT DOCUMENTS

| | | | |
|---|---|---|---|
| 8,480,128 B2* | 7/2013 | Fukawatase | B60R 21/23138 280/730.2 |
| 9,016,718 B2 | 4/2015 | Fukawatase et al. | |
| 9,505,374 B2 | 11/2016 | Matsuzaki et al. | |
| 9,533,648 B2 | 1/2017 | Fujiwara | |
| 2004/0051285 A1* | 3/2004 | Fischer | B60R 21/233 280/739 |
| 2007/0108753 A1* | 5/2007 | Pang | B60R 21/231 280/743.2 |
| 2009/0224520 A1 | 9/2009 | Higuchi | |
| 2011/0193329 A1 | 8/2011 | Higuchi | |
| 2012/0025499 A1* | 2/2012 | Shibayama | B60R 21/233 280/730.2 |
| 2012/0049498 A1* | 3/2012 | Wiik | B60R 21/23138 280/743.2 |
| 2012/0091697 A1* | 4/2012 | Wiik | B60R 21/23138 280/730.2 |
| 2014/0035264 A1* | 2/2014 | Fukushima | B60R 21/23138 280/730.2 |
| 2014/0151984 A1 | 6/2014 | Fukawatase et al. | |
| 2014/0284906 A1* | 9/2014 | Akiyama | B60R 21/23138 280/730.2 |
| 2015/0076803 A1* | 3/2015 | Fujiwara | B60R 21/207 280/730.2 |
| 2016/0114755 A1 | 4/2016 | Matsuzaki et al. | |
| 2016/0114757 A1* | 4/2016 | Fujiwara | B60R 21/23138 280/729 |
| 2016/0200278 A1* | 7/2016 | Wiik | B60R 21/23138 280/729 |
| 2017/0129444 A1* | 5/2017 | Fukawatase | B60R 21/233 |
| 2017/0174174 A1* | 6/2017 | Ohno | B60R 21/239 |
| 2017/0182963 A1* | 6/2017 | Hiraiwa | B60R 21/233 |
| 2017/0182969 A1* | 6/2017 | Fujiwara | B60R 21/23138 |

FOREIGN PATENT DOCUMENTS

| | | |
|---|---|---|
| JP | 2009137441 | 6/2009 |
| JP | 2009234562 | 10/2009 |
| JP | 2012051557 | 3/2012 |
| JP | 5754436 | 7/2015 |
| JP | 2016083955 | 5/2016 |
| JP | 2016107721 A | 6/2016 |
| JP | 2016203945 | 12/2016 |
| KR | 20080101478 | 11/2008 |
| KR | 20120051279 A | 5/2012 |
| KR | 101262977 | 5/2013 |
| KR | 101292323 | 7/2013 |
| KR | 20150001100 A | 1/2015 |
| KR | 101637205 | 7/2016 |
| WO | 2017014421 | 1/2017 |

* cited by examiner

SELF STANDING CENTER SIDE AIRBAG

CROSS REFERENCE TO RELATED APPLICATION

The present application claims priority to and the benefit of Korean Patent Application No. 10-2016-0144500, filed on Nov. 1, 2016, the entire contents of which are incorporated herein for all purposes by this reference.

BACKGROUND

Technical Field

The present disclosure relates to a center side airbag restricting a transverse movement of a passenger in a side collision situation to protect the passenger.

Description of the Related Art

The existing airbags that restrict a transverse movement of a passenger in an interior of a vehicle have a structure whereby the airbag does not have a support force but secures or obtains the support force by support from other objects, or the like. For example, the existing airbag has a structure in which the airbag is supported by a center console or is unfolded between a driver and a passenger on a passenger seat to be supported therebetween to thereby prevent a collision between the driver and the passenger.

However, when there is no passenger on a passenger seat in an actual collision situation, the existing airbag itself does not have the support force so as not to restrict a transverse movement of the passenger and does not exert an effect of passenger protection since the airbag frequently collapses depending on a transverse movement of the passenger.

In addition, if riding positions of the driver and the passenger on the passenger seat with respect to a lateral collision direction are not aligned on the same line widthwise across the vehicle, even though there is a passenger on the passenger seat, an airbag cushion is not provided with a support force, such that the airbag may not effectively protect the passenger.

The matters described as the related art have been provided only to assist in understanding the background of the present disclosure and should not be considered as corresponding to the related art known to those skilled in the art.

SUMMARY

An object of the present disclosure is to provide a self standing center side airbag that restricts a transverse movement of a far side passenger by a center side airbag under a lateral collision situation and itself has a support force by a tether without being supported by surrounding structures.

According to an embodiment of the present disclosure, there is provided a self standing center side airbag. The self standing center side airbag includes: an airbag cushion configured to be located at a side of an interior of a seat back; a first through hole configured to penetrate through the airbag cushion and be located at a back with respect to a central line that bisects the airbag cushion in a front and back direction; a second through hole configured to penetrate through the airbag cushion and be located at a front with respect to the central line that bisects the airbag cushion in the front and back direction; and a tether configured to penetrate through the first through hole and the second through hole and have both ends fixed at the seat back side.

The self standing center side airbag may further include an inflator configured to supply gas from a lower end portion of the airbag cushion into the airbag cushion.

Both ends of the tether may be fixed to the inflator.

The tether may include: a first section corresponding to a section from the seat back to the first through hole; a second section corresponding to a section from the first through hole to the second through hole; and a third section corresponding to a section from the second through hole to the seat back, and a sum of lengths of the first section to the third section may be constant.

The length of the tether may be formed to be shorter than a sum of the section from the seat back of the airbag cushion to the first through hole, the section from the first through hole to the second through hole, and the section from the second through hole to the seat back.

Both ends of the tether may be fixed at the seat back side and may penetrate through the first through hole from a passenger side of the airbag cushion toward a center console and penetrate through the second through hole from the center console toward the passenger to be fixed to the seat back.

The first through hole may be located above a shoulder height of a passenger.

The second through hole may be located above the first through hole and may be located at a front end portion of the airbag cushion.

A predetermined area of the airbag cushion including the first through hole may be provided with a non-expansion part.

The self standing center side airbag may further include a bending part formed between the first through hole and the second through hole.

The self standing center side airbag may further include an extending support part configured to be located at a center console side of the airbag cushion, bent toward the center console side, and provided so that a bending line coincides with a front outline of the airbag cushion, in which the second through hole may be located at a front end portion of the extending support part.

The self standing center side airbag may further include a third through hole configured to be located between the first through hole and the second through hole and located above the first through hole and the second through hole, in which the tether may sequentially penetrate through the first through hole, the third through hole, and the second through hole and wherein both ends of the tether may be fixed to the seat back side.

The tether may sequentially penetrate through the first through hole, the third through hole, and the second through hole and may be fixedly coupled to the first through hole.

DETAILED DESCRIPTION OF THE DISCLOSURE

Hereinafter, embodiments of the present disclosure will be described with reference to the accompanying drawings.

Figure 1:
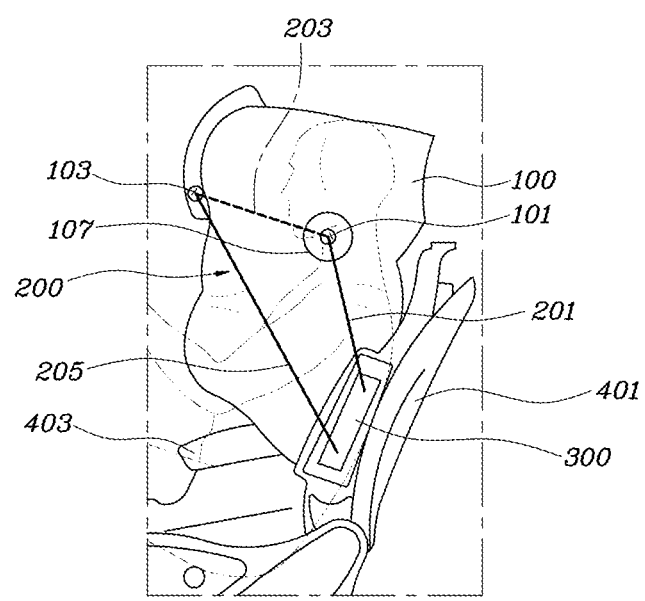
FIG. 1 is a side view of a self standing center airbag according to an embodiment of the present disclosure.
Figure 2A:
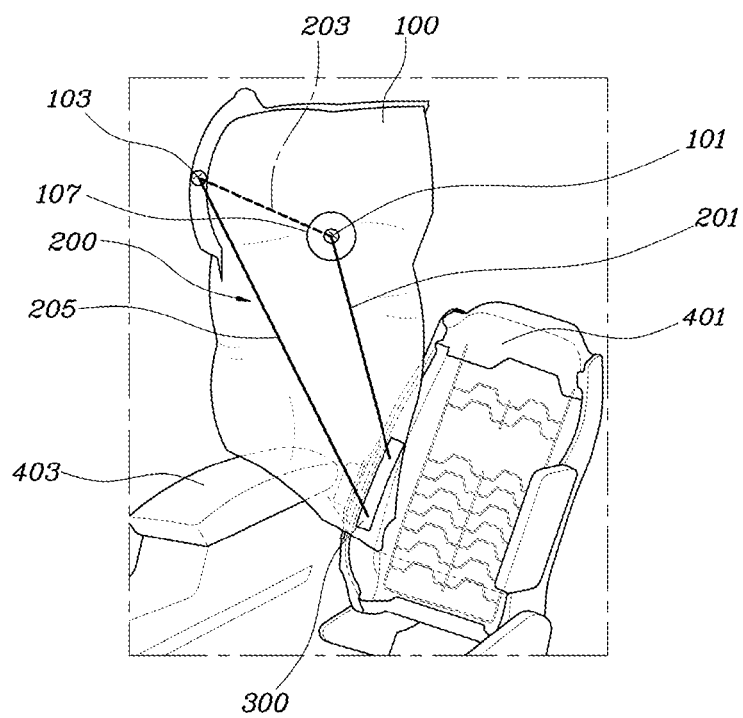
FIGS. 2A and 2B are diagrams illustrating an operation sequence of the self standing center airbag according to FIG. 1.
Figure 2B:
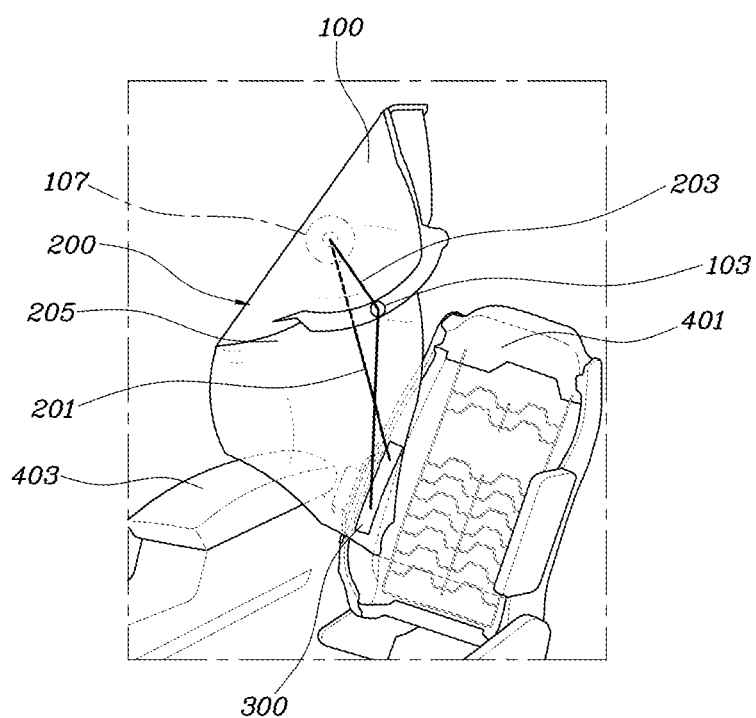

FIG. 1 is a side view of a self standing center airbag according to an embodiment of the present disclosure and FIGS. 2A and 2B are diagrams illustrating an operation sequence of the self standing center airbag according to FIG. 1.

FIGS. 3A-6 are diagrams illustrating self standing center airbags according to various embodiments of the present disclosure. FIG. 7 is a diagram illustrating an extending support part of a self standing center airbag according to an embodiment of the present disclosure. FIG. 8 is a diagram illustrating a self standing center airbag according to another embodiment of the present disclosure.

The self standing center side airbag according to an embodiment of the present disclosure includes an airbag cushion 100 located at a side of a seat back 401, the side facing an interior of a vehicle. The self standing center side airbag includes a first through hole 101 penetrating through the airbag cushion 100 and located at a back with respect to a central line that bisects the airbag cushion 100 in a front and back direction. The self standing center side airbag includes a second through hole 103 penetrating through the airbag cushion 100 and located at a front with respect to the central line that bisects the airbag cushion 100 in the front and back direction. The self standing center side airbag also includes a tether 200 penetrating through the first through hole 101 and the second through hole 103 and having both ends fixed at the seat back 401 side. The self standing center side airbag may further include an inflator 300 that supplies gas from a lower end portion of the airbag cushion 100 into the airbag cushion 100. Both ends of the tether 200 may be fixed to the inflator 300.

The tether 200 may include a first section 201 corresponding to a section from the seat back 401 to the first through hole 101, a second section 203 corresponding to a section from the first through hole 101 to the second through hole 103, and a third section 205 corresponding to a section from the second through hole 103 to the seat back 401. A sum of lengths of the first section 201 to the third section 205 may be constant.

Both ends of the tether 200 are fixed at the seat back 401 side and may penetrate through the first through hole 101 from a passenger side of the airbag cushion 100 toward a center console 403 and penetrate through the second through hole 103 from the center console 403 toward the passenger to be fixed to the seat back 401.

Referring to FIGS. 1, 2A, and 2B, the self standing center side airbag according to this embodiment is not located at a door side of a vehicle but at the interior of the vehicle to serve to restrict a transverse movement of the passenger. The airbag cushion 100 itself may secure or provide a support force by the tether 200 penetrating through the first through hole 101 and the second through hole 103.

In a method for securing a support force of an airbag cushion 100, both ends of the tether 200 are fixed to a frame of the side of the seat back 401, or the like without a portion directly fastened to the airbag cushion 100. However, to modularize the self standing center side airbag, both ends of the tether 200 may be fixed to the inflator 300 supplying gas to the airbag cushion 100.

The tether 200 is not physically divided, but may be divided into the first section 201 to the third section 205 in a location relationship with the first through hole 101 and the second through hole 103 of the airbag cushion 100. A total length of the tether 200 is constantly maintained and is not directly fixed to the airbag cushion 100. Therefore, the tether 200 may slidably move through the first through hole 101 and the second through hole 103 and may be changed in a state in which the total length of the first section 201 to the third section 205 is maintained.

For convenience of description, the self standing center side airbag installed at a passenger seat will be mainly described. If a lateral collision occurs at a passenger seat side, a driver is moved toward the center console 403 direction by inertia. If a driver's pelvis comes into contact with a side of the center console 403, an upper body of a driver is rotated with respect to the contact portion. At this point, a driver's shoulder portion first comes into contact with a portion of the first through hole 101 at the back of the airbag cushion 100 to push the airbag cushion 100 toward the center console 403. Therefore, the length of the first section 201 of the tether 200 becomes relatively longer while the total length of the tether 200 is constant. As a result, the portion of the second through hole 103 of the airbag cushion 100 is pulled toward the driver side while the lengths of the second section 203 and the third section 205 become short, thereby supporting the driver. By doing so, the airbag cushion 100 may self-restrict the transverse movement of the driver even if the airbag cushion does not obtain a support force from other structures within a vehicle or from a passenger on a passenger seat.

Figure 4A:
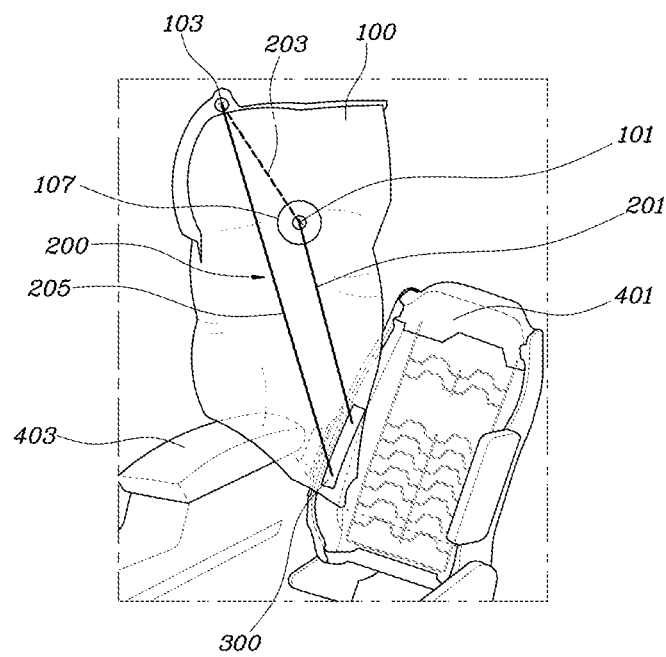
Figure 4B:
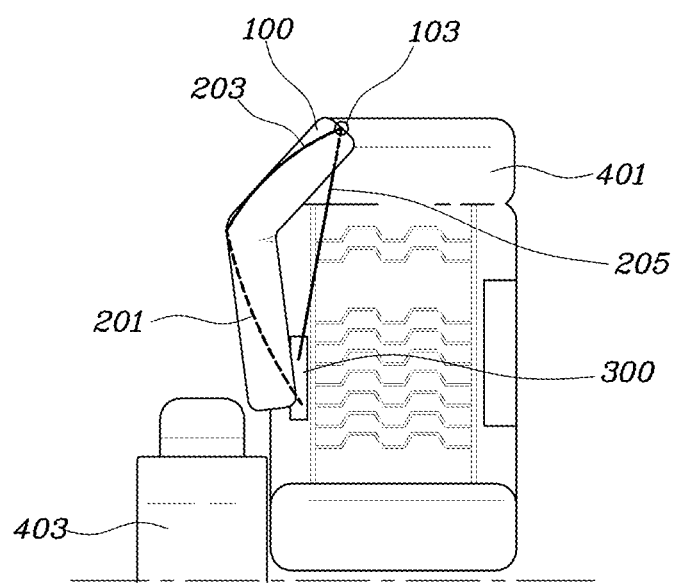
Figure 5:
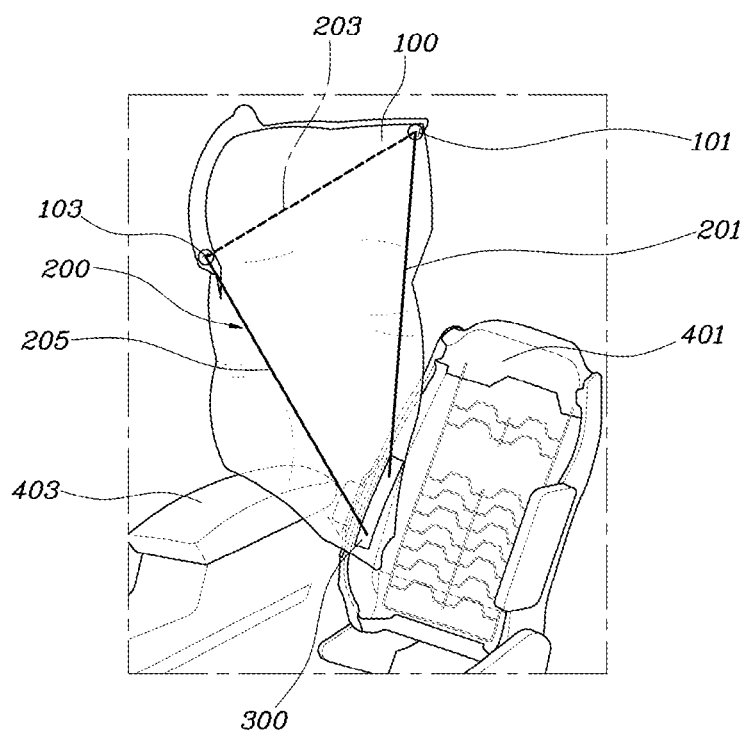

In the embodiment of FIGS. 4A and 4B, the portion of the second through hole 103 is located ahead of the first through hole 101 and is formed at an upper end portion of the airbag cushion 100. At this time, if the driver's shoulder is loaded, the upper end portion of the airbag cushion 100 is bent toward the driver to fill a space between the driver's shoulder and a driver's head to prevent a head rotation of the driver. This thereby prevents a driver's neck from being injured.

The length of the tether 200 may be formed to be shorter than a sum of the section from the seat back 401 of the airbag cushion 100 to the first through hole 101, the section from the first through hole 101 to the second through hole 103, and the section from the second through hole 103 to the seat back 401.

The sum of the overall length of the tether 200 is constant and is formed to be shorter than the sum of the section from the seat back 401 to the first through hole 101, the section from the first through hole 101 to the second through hole 103, and the section from the second through hole 103 to the seat back 401 when the airbag cushion 100 is completely unfolded. Thus, the portion of the second through hole 103 of the airbag cushion 100 is pulled toward the driver, even before the driver is loaded into the airbag cushion 100. By doing so, when the actual driver is loaded into the airbag cushion 100, the airbag cushion 100 may quickly support the driver.

The first through hole 101 may be located above the passenger's shoulder, i.e., above a height of the passenger's shoulder.

Referring to FIGS. 2A and 2B, this first through hole 101 location is to free the slide movement of the tether 200 by minimizing the interference with the location of the first through hole 101 while the passenger's shoulder is loaded into the airbag cushion 100.

The second through hole 103 is located above the first through hole 101 and may be located at a front end portion of the airbag cushion 100.

By locating the second through hole 103 as such, the front end portion of the airbag cushion 100 is pulled toward the passenger to be able to restrict the longitudinal movement of the passenger as well as the transverse movement of the passenger.

Figure 6:
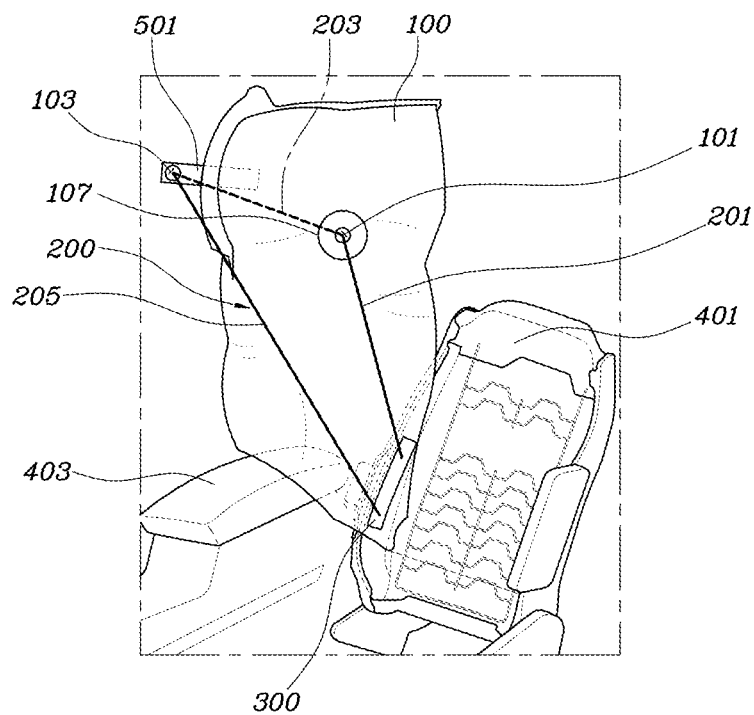

Referring to FIG. 6, a predetermined area of the airbag cushion 100, including the first through hole 101, may be provided with a non-expansion part 107. The non-expansion part 107 may be provided to optimize a volume of the airbag cushion 100 and smooth the slide movement between the first through hole 101 and the tether 200.

The self standing center side airbag may further include a bending part 109 (see FIG. 3A) that is formed between the first through hole 101 and the second through hole 103.

Figure 3A:
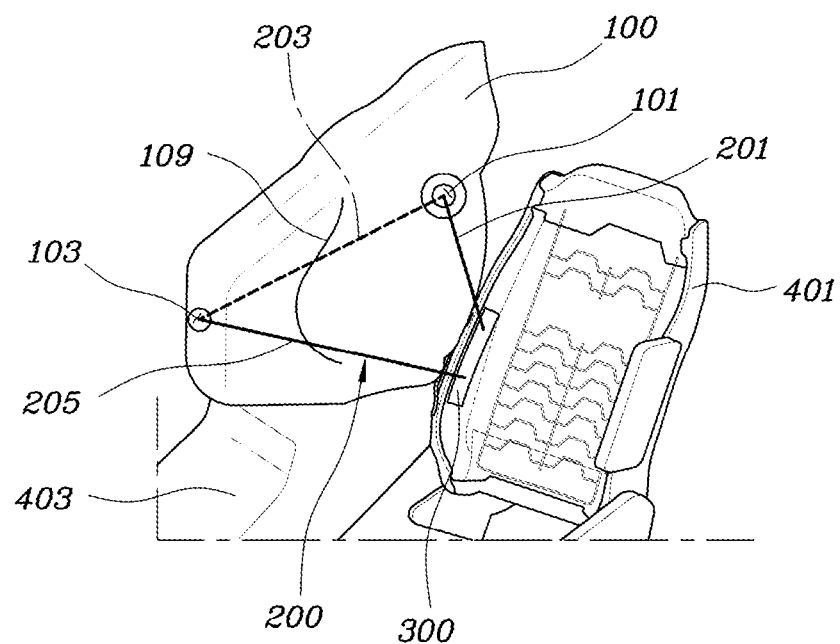
FIGS. 3A-6 are diagrams illustrating self standing center airbags according to various embodiments of the present disclosure.
Figure 3B:
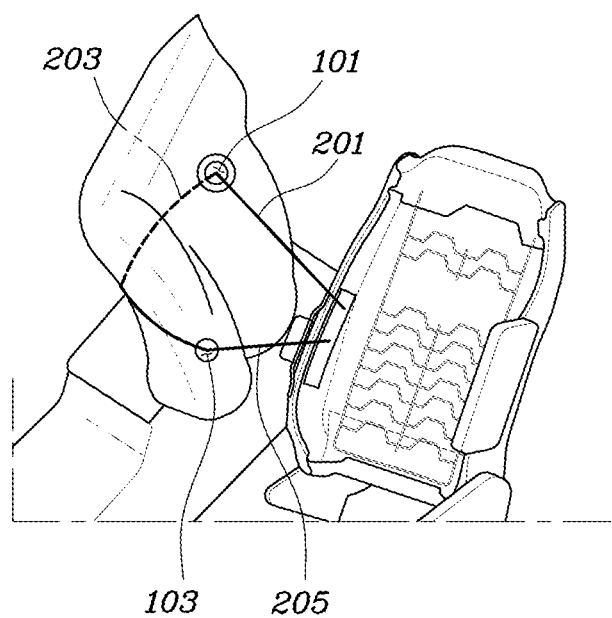

Referring to FIGS. 3A and 3B, the amount of the front end portion of the airbag cushion 100 that is bent toward the passenger through the bending part 109 that is formed between the first through hole 101 and the second through hole 103 is increased to more certainly restrict the transverse movement and the longitudinal movement of the passenger. More specifically, increasing the amount of the front end portion of the airbag cushion 100 that is bent toward the passenger by increasing a longitudinal size of the airbag cushion 100 while forming the bending part 109 may more effectively restrict the transverse movement and the longitudinal movement of the passenger.

Figure 7A:
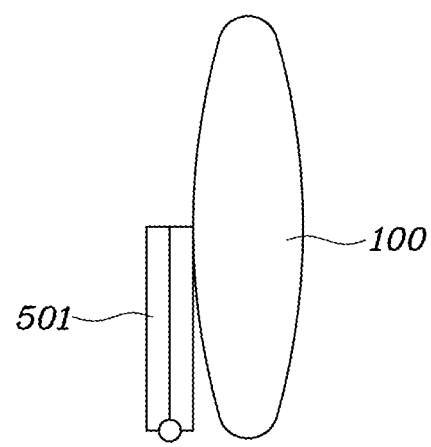
FIGS. 7A and 7B are diagrams illustrating an extending support part of a self standing center airbag according to an embodiment of the present disclosure.
Figure 7B:
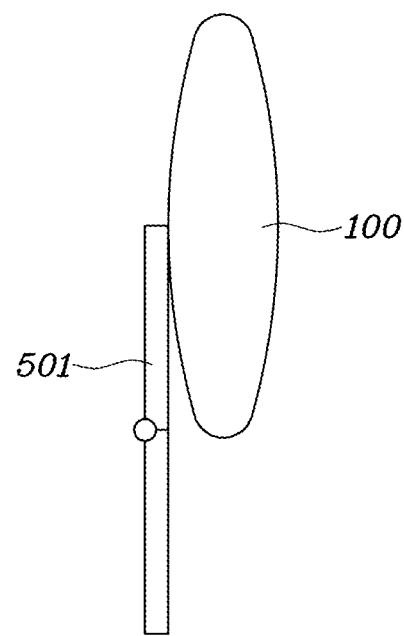
Figure 8:
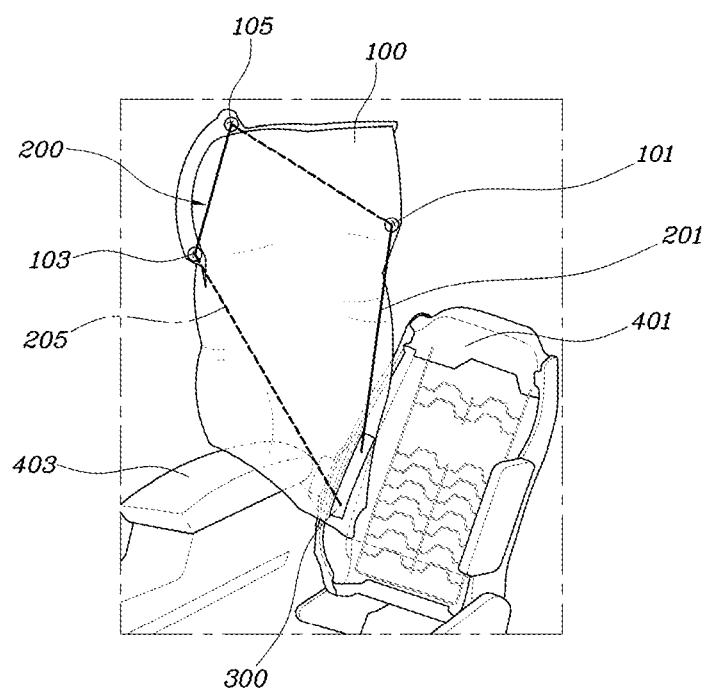
FIG. 8 is a diagram illustrating a self standing center airbag according to another embodiment of the present disclosure.

Referring to FIGS. 7A and 7B, the self standing center side airbag may further include an extending support part 501 that is located at the side of the airbag cushion 100 that faces the center console 403, bent toward the center console 403 side. The extending support part 501 may be provided so that a bending line coincides with a front outline of the airbag cushion 100, in which the second through hole 103 may be located at a front end portion of the extending support part 501.

The extending support part 501 may forwardly move the location of the second through hole 103 with respect to the passenger. By doing so, the tether 200 may increase the pulling force of the airbag cushion 100 toward the passenger. The pulling force of the front end portion of the airbag cushion 100 toward the passenger by the tether 200 is applied to the portion of the second through hole 103. The extending support part 501 may increase the length of the second section 203 from the first through hole 101 to the second through hole 103 to increase a torque in the passenger direction.

As a method for increasing a length of a second section 203, there is a method for increasing a size of an airbag cushion 100, which results in increasing the capacity of the inflator 300 while increasing the volume of the airbag cushion 100 and making the packaging of the side airbag difficult. Therefore, the present disclosure solves the above problems using the extending support part 501.

Further, the extending support part 501 has a hinge shape in which it is bent only toward the center console 403 side and is not bent toward the passenger. This is to bend the extending support part 501 during the packaging of the side airbag to reduce the size and effectively apply a force to the airbag cushion 100 during the unfolding.

Referring to FIG. 8, the self standing center side airbag may further include a third through hole 105 located between the first through hole 101 and the second through hole 103 and located above the first through hole 101 and the second through hole 103. The tether 200 sequentially penetrates through the first through hole 101, the third through hole 105, and the second through hole 103 and both ends of the tether 200 may be fixed to the side of the seat back 401. Alternatively, the tether 200 sequentially penetrates through the first through hole 101, the third through hole 105, and the second through hole 103 and may be fixedly coupled with the first through hole 101.

The tether 200 may pull the upper end portion of the airbag cushion 100 toward the passenger while pulling the front end portion of the airbag cushion 100 toward the passenger through the third through hole 105 to allow the airbag cushion 100 to support the passenger's head. This thereby prevents the passenger's neck from being injured.

Further, the tether is fixedly coupled with the first through hole 101 to prevent the airbag cushion 100 from being excessively pushed toward the center console 403 side due to the contact with the passenger's shoulder. However, the section from the first through hole 101 to the third through hole 105, the section from the third through hole 105 to the second through hole 103, and the section from the second through hole 103 to the seat back 401 are slidably moved, such that the self standing center side airbag itself may still secure the support force only by the airbag cushion 100.

As described above, according to the embodiments of the present disclosure, the self standing center side airbag itself may secure or provide the support force capable of restricting the transverse movement of the passenger without being supported by the surrounding structures or without the support between a passenger on the passenger seat and the driver.

Although the present disclosure has been shown and described with respect to specific embodiments, it will be obvious to those skilled in the art that the present disclosure may be variously modified and altered without departing from the spirit and scope of the present disclosure as defined by the following claims.

What is claimed is:
1. A self standing center side airbag, comprising:
    an airbag cushion configured to be located at a side of an interior facing side of a seat back;
    a first through hole configured to penetrate through the airbag cushion, the first through hole located at a back with respect to a central line that bisects the airbag cushion in a front and back direction;
    a second through hole configured to penetrate through the airbag cushion, the second through hole located at a front with respect to the central line that bisects the airbag cushion in the front and back direction; and
    a tether configured to penetrate through the first through hole and the second through hole and have both ends fixed at the seat back side.
2. The self standing center side airbag of claim 1, further comprising:
    an inflator configured to supply gas from a lower end portion of the airbag cushion into the airbag cushion.
3. The self standing center side airbag of claim 2, wherein the both ends of the tether are fixed to the inflator.
4. The self standing center side airbag of claim 1, wherein the tether includes:
    a first section corresponding to a section from the seat back to the first through hole;
    a second section corresponding to a section from the first through hole to the second through hole; and a third section corresponding to a section from the second through hole to the seat back, and
a length of the tether is a sum of lengths of the first section to the third section and is constant.

5. The self standing center side airbag of claim 4, wherein the length of the tether is formed to be shorter than a sum of the section from the seat back of the airbag cushion to the first through hole, the section from the first through hole to the second through hole, and the section from the second through hole to the seat back.

6. The self standing center side airbag of claim 1, wherein the both ends of the tether are fixed at the seat back side and penetrate through the first through hole from a passenger side of the airbag cushion toward a center console and penetrate through the second through hole from the center console toward the passenger to be fixed to the seat back.

7. The self standing center side airbag of claim 1, wherein the first through hole is located above a height of a passenger's shoulder.

8. The self standing center side airbag of claim 7, wherein the second through hole is located above the first through hole and is located at a front end portion of the airbag cushion.

9. The self standing center side airbag of claim 1, wherein a predetermined area of the airbag cushion including the first through hole is provided with a non-expansion part.

10. The self standing center side airbag of claim 1, further comprising:
a bending part formed between the first through hole and the second through hole.

11. The self standing center side airbag of claim 1, further comprising:
an extending support part configured to be located at a center console side of the airbag cushion, bent toward the center console side, and provided so that a bending line coincides with a front outline of the airbag cushion,
wherein the second through hole is located at a front end portion of the extending support part.

12. The self standing center side airbag of claim 1, further comprising:
a third through hole configured to be located between the first through hole and the second through hole and to be located above the first through hole and the second through hole,
wherein the tether sequentially penetrates through the first through hole, the third through hole, and the second through hole and the both ends of the tether are fixed to the seat back side.

13. The self standing center side airbag of claim 12, wherein the tether sequentially penetrates through the first through hole, the third through hole, and the second through hole and is fixedly coupled to the first through hole.

* * * * *